Patented June 30, 1953

2,644,000

UNITED STATES PATENT OFFICE 2,644,000

NEW QUINOXALINE DERIVATIVES

Justus Kenneth Landquist, Blackley, Manchester, England, assignor to Imperial Chemical Industries Limited, a corporation of Great Britain No Drawing. Application May 14, 1951, Serial No. 226,297. In Great Britain May 24, 1950

2 Claims. (Cl. 260—250)

This invention relates to new quinoxaline derivatives and more particularly it relates to new quinoxaline-di-N-oxides which are useful as therapeutic agents, for example as amoebicides.

I have found that certain new quinoxaline-di-N-oxides, namely those of the general formula:

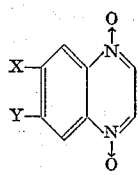

wherein X stands for halogen or for a methyl group and Y stands for hydrogen or for a methyl group, possess good therapeutic activity against infections for example with amoebae.

My invention therefore comprises the new compounds of the above stated formula.

The said new compounds may be made by oxidation by means of per-acids of the corresponding quinoxalines or of their mono-N oxides. As per-acids there may be used for example per-acetic acid, per-formic acid and monoperphthalic acid. The per-acid may be generated in presence of the quinoxaline. For example the quinoxaline may be oxidised by means of hydrogen peroxide in glacial acetic acid solution. The starting materials, the quinoxalines themselves, may be obtained in the known manner by interaction of the appropriately substituted o-phenylenediamine with glyoxal or a functional derivative thereof, for example its sodium bisulphite compound.

The invention is illustrated but not limited by the following examples in which the parts are by weight.

Example 1

7.2 parts of 6-methylquinoxaline, 200 parts of glacial acetic acid and 50 parts of 30% aqueous hydrogen peroxide are heated together at 50° C. for 20 hours. The mixture is then cooled and filtered and the filtrate is made just alkaline by the addition of 40% aqueous sodium hydroxide and sufficient ice to keep the temperature at 10–15° C. It is then extracted 3 times with 350 parts of chloroform. The extract is dried over anhydrous sodium sulphate and the chloroform is evaporated. The residual 6-methylquinoxaline-1:4-di-N-oxide is crystallised from ethanol to give yellow plates of M. P. 218–219° C.

Example 2

20 parts of 6-methylquinoxaline and 400 parts of a 1.2 molar solution of peracetic acid in acetic acid are heated at 50° C. for 18 hours and the solution is evaporated at 15–20 mm. to one fifth of its bulk and poured on to 200 parts of ice. The mixture is neutralised with 40% aqueous sodium hydroxide and filtered. The filtrate is extracted with chloroform and the solid thus extracted is combined with the solid residue from the filtration. It is then crystallised from alcohol to give 6-methylquinoxaline-1:4-di-N-oxide, M. P. 218–219° C.

Example 3

16 parts of 6:7-dimethylquinoxaline (colourless plates of M. P. 100–101° C. made by reacting 4:5-diamino-1:2-dimethylbenzene with glyoxal sodium bisulphite in aqueous solution) and 260 parts of a 1.2 molar solution of peracetic acid in acetic acid are heated together at 50° C. for 20 hours and the product is isolated as described in Example 2. 6:7-dimethylquinoxaline-1:4-di-N-oxide crystallises from ethanol in yellow needles of M. P. 220° C.

Example 4

8 parts of 6-chloroquinoxaline, 150 parts of anhydrous formic acid and 50 parts of 30% hydrogen peroxide are heated together to 40–45° C. and the temperature is then maintained by cooling at 45–55° C. for 40 minutes. The mixture is then heated at 50° C. for 18 hours, cooled and filtered. The filtrate is evaporated at 15–20 mm. to about one fifth of its bulk and is then neutralised by the addition of 40% aqueous sodium hydroxide and sufficient ice to keep the temperature low (10–15° C.). 6-chloroquinoxaline-1:4-di-N-oxide is filtered off, washed with water, and purified by recrystallisation from ethanol to give yellow needles of M. P. 211–212° C.

Instead of 150 parts of anhydrous formic acid in the process of this example there may be used an equal amount of aqueous formic acid of 85% strength, or a mixture of 75 parts of 85% formic acid and 63 parts of acetic anhydride.

Example 5

8.9 parts of 6-chloro-7-methylquinoxaline (colourless needles, M. P. 120–122° C., made by condensing 6-chloro-3:4-diaminotoluene with glyoxal sodium bisulphite in aqueous solution), 100 parts of anhydrous formic acid and 35 parts of 30% hydrogen peroxide are caused to react together as described in Example 4. The solid product which separates on neutralisation of the filtered and evaporated reaction mixture is crystallised from ethanol, and 6-chloro-7-methylquinoxaline-1:4-di-N-oxide is obtained as yellow needles of M. P. 227° C.

*Example 6*

8.2 parts of 6-chloroquinoxaline, 200 parts of glacial acetic acid and 50 parts of 30% hydrogen peroxide are heated together at 50° C. for 18 hours. The cooled solution is filtered, diluted with 500 parts of ice and water and neutralised by the addition of 40% aqeuous sodium hydroxide. The mixture is extracted 3 times with 300 parts of chloroform and the extract is dried over anhydrous sodium sulphate and evaporated. The residue of 6-chloroquinoxaline mono-N-oxide is purified by recrystallisation from ethanol and forms needles of M. P. 151–152° C.

2.6 parts of 6-chloroquinoxaline mono-N-oxide and 20 parts of a 1.2 molar solution of peracetic acid in acetic acid are heated together at 50° C. for 18 hours and the mixture is poured on to 100 parts of ice and then neutralised with 40% aqeuous sodium hydroxide. 6-chloroquinoxaline-1:4-di-N-oxide is filtered off and crystallised from ethanol; it has M. P. 210–211° C.

*Example 7*

5.5 parts of 6-bromoquinoxaline, 75 parts of anhydrous formic acid and 25 parts of 30% hydrogen peroxide are reacted together as described in Example 4. The reaction mixture is filtered and the filtrate is evaporated, neutralised and filtered again. The solid residue consists of 6-bromoquinoxaline - 1:4-di-N-oxide which after crystallisation from ethanol consists of yellow plates of M. P. 223–225° C. The starting material, 6-bromoquinoxaline, B. P. 146–149° C./18 mm., M. P. 48–49° C., may be obtained from 6-aminoquinoxaline by disazotisation and treatment of the diazo-derivative with suprous bromide.

*Example 8*

10.6 parts of 6-bromo-7-methylquinoxaline (M. P. 127–128° C., obtainable by condensing 6-bromo-3:4-diaminotoluene with glyoxal sodium bisulphite in aqueous solution), 100 parts of anhydrous formic acid and 35 parts of 30% hydrogen peroxide are reacted together as described in Example 4, and the reaction product is isolated as described in Example 7. 6-bromo-7-methylquinoxaline-di-N-oxide is obtained and after crystallisation from ethanol consists of yellow needles of M. P. 222–224° C.

What I claim is:

1. Quinoxaline-di-N-oxides selected from the group consisting of 6:7-dimethyl quinoxaline-1:4 - di-N-oxide, 6-chloroquinoxaline-1:4-di-N-oxide, 6-chloro-7-methyl-quinoxaline-1:4-di-N-oxide, 6-bromoquinoxaline-1:4-di-N-oxide.

2. As a new compound, 6-chloro-7-methyl-quinoxaline-1:4-di-N-oxide.

JUSTUS KENNETH LANDQUIST.

References Cited in the file of this patent

UNITED STATES PATENTS

| Number | Name | Date |
|---|---|---|
| 2,416,658 | Van Arendonk | Feb. 25, 1947 |

OTHER REFERENCES

McIlwain, J. Chem. Soc. 1943, 322–5.